March 29, 1966  D. F. McKEOWN  3,243,061
VEHICLE WITH BOOM
Filed Aug. 7, 1964  3 Sheets-Sheet 1

David F. McKeown
INVENTOR.

BY Ramsey, Kalish and Hartnell

Attys.

March 29, 1966  D. F. McKEOWN  3,243,061
VEHICLE WITH BOOM
Filed Aug. 7, 1964  3 Sheets-Sheet 2
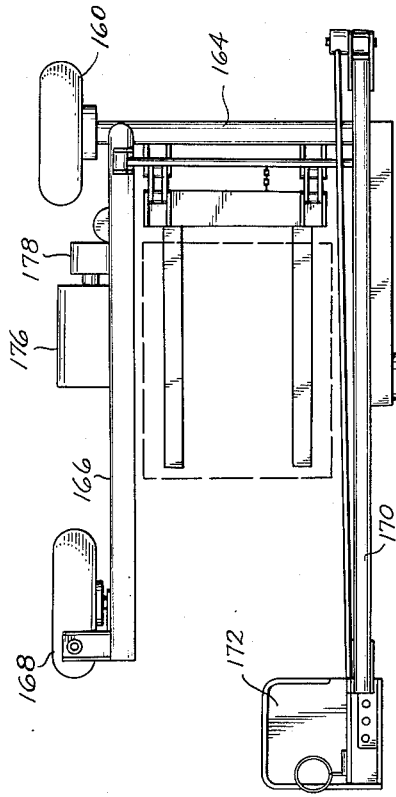
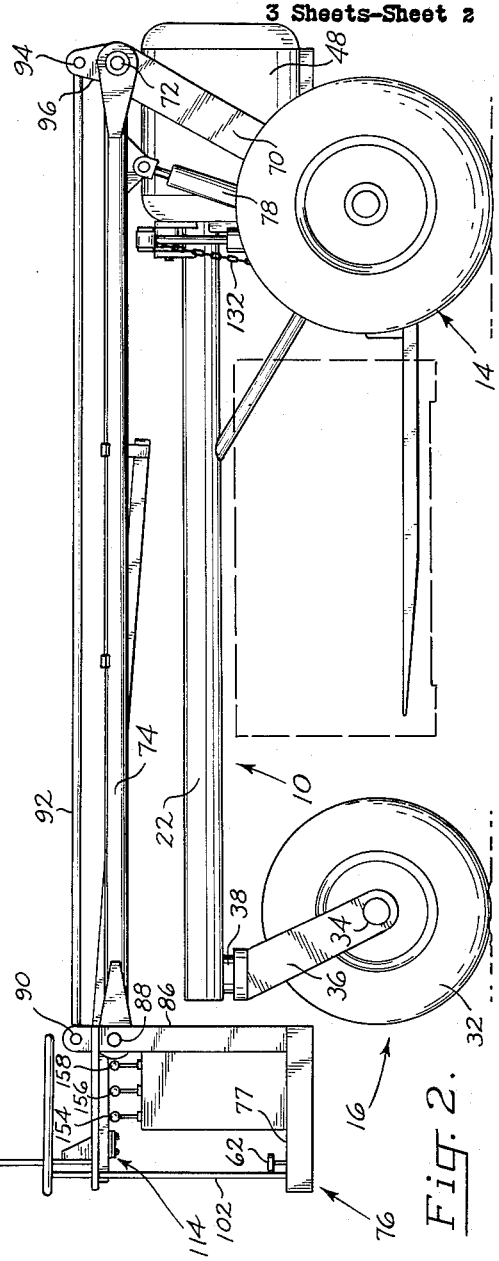
David F. McKeown
INVENTOR.
BY Ramsey, Kalisch and Hartwell
Attys.

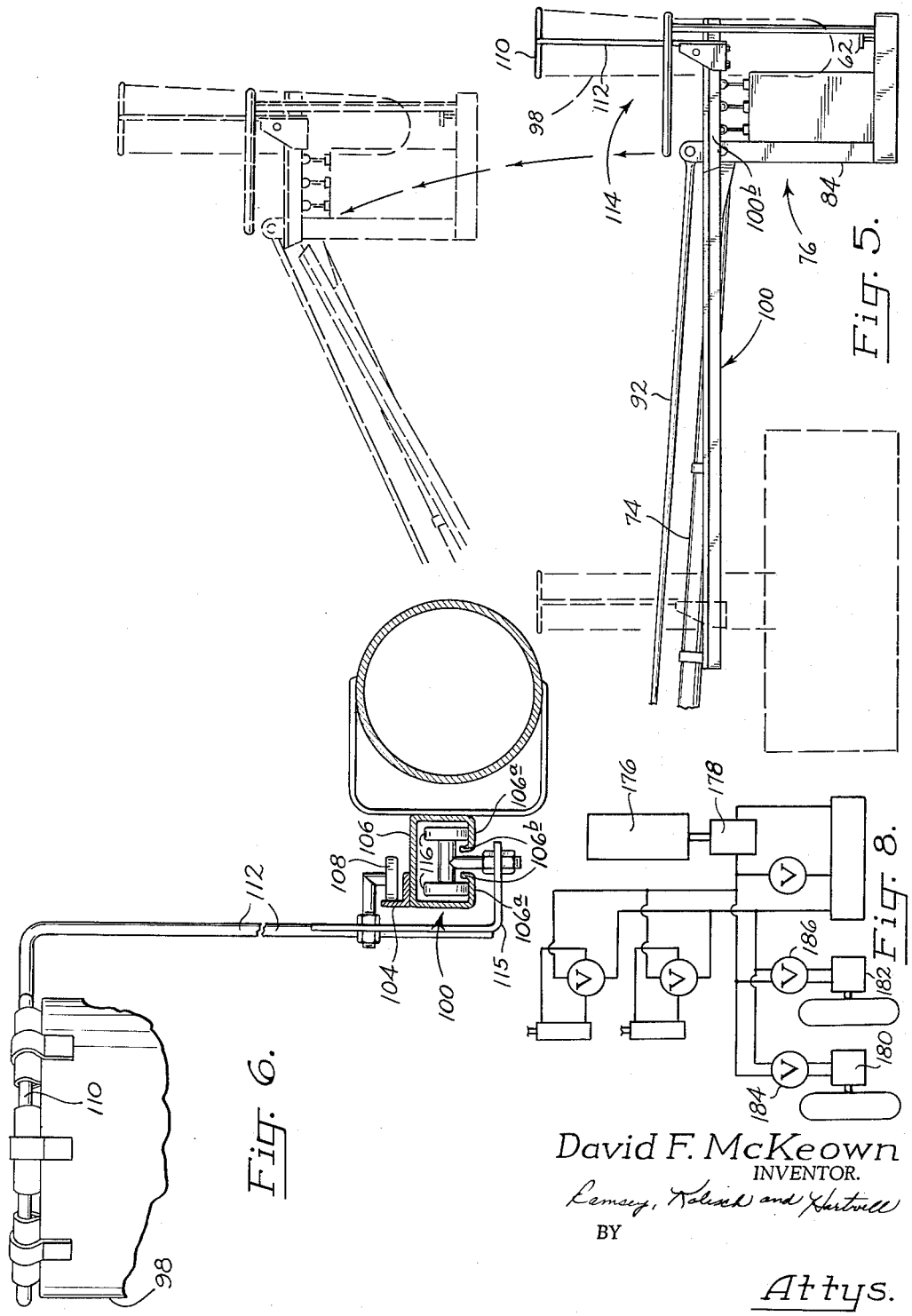

United States Patent Office 3,243,061
Patented Mar. 29, 1966

3,243,061
VEHICLE WITH BOOM
David F. McKeown, Rte. 2, Box 354,
Hood River, Oreg.
Filed Aug. 7, 1964, Ser. No. 388,229
14 Claims. (Cl. 214—83.1)

This invention relates to vehicles generally, and more particularly to a vehicle including a boom having an operator's platform thereon which may be raised and lowered to change the position of the platform. As contemplated herein, the vehicle has particular utility in connection with the care of orchards, as the vehicle may be employed in the pruning, spraying, and other care of trees, as well as in the picking of fruit therefrom.

In the past, with farm labor relatively plentiful, an orchard could be cared for by workmen using ladders and simple tools. However, as farm labor costs have risen, it has become apparent that past practices cannot be followed and still harvest a product economically.

In general terms, this invention features a relatively simple, low-cost vehicle including a boom-supported platform which is easily maneuvered in a small space, is capable of traveling over uneven terrain while maintaining proper balance on the ground, and is readily controlled by a workman stationed on the platform. With such characteristics, the vehicle may be used in pruning, spraying and other operations, with a resulting substantial increase in the efficiency of a workman.

More specifically, an object of the invention is to provide a vehicle including a boom having multiple wheel assemblies providing novel tricycle-type support for the vehicle. By reason of the tricycle-type support rendered by the wheel assemblies, each wheel assembly provides its proper share of support for the vehicle, regardless of unevenness in ground contour. This results in improved stability in the boom, and minimizes stresses in the vehicle frame.

Another object is to provide such a vehicle, including a boom pivotally mounted adjacent its rear end on a rear portion of the vehicle, where means is included for driving a pair of lateral support wheel assemblies supporting the vehicle's rear end. These wheel assemblies therefore constitute traction wheel assemblies, and when the boom is raised, a weight shift occurs over the wheel assemblies with a resulting increase in traction.

A feature related to the above is that the drive means for the traction wheel assemblies includes mechanism for driving the wheel assemblies at different speeds, whereby the vehicle may be steered.

A further object is to provide a vehicle, with multiple wheel assemblies providing tricycle-type support, which includes a single wheel assembly supporting the front end of the vehicle, preferably swiveled to accommodate steering as indicated above, and this swiveled wheel assembly is located adjacent one side of the vehicle on a longitudinally extending frame section laterally spaced from a longitudinally extending boom with platform provided on the other side of the vehicle. With this organization, a receptacle to hold picked fruit may be mounted low to the ground over the longitudinal midline of the vehicle. An opening is provided at the front of the vehicle whereby a trunk of a tree may be straddled, by the boom on one side and the longitudinal frame section supporting the swiveled wheel assembly on the other side of the trunk. The platform on the boom in this way is enabled to be positioned at points that otherwise would be inaccessible.

A further object is to provide a vehicle including a boom mounting a platform where the platform is offset relative to the boom in such a way that a device for holding picked fruit, etc. may be moved along the boom and over the platform to a position within easy reach of a worker picking fruit.

According to the invention, the boom is swingable up and down, to place the platform on the boom at different elevations. Side-to-side swinging of the boom is produced by turning the vehicle about its rear wheels, with the front end of the vehicle swinging freely on the swiveled front wheel assembly. This results in simplicity and stability, with the platform on the boom at the same time being movable in all directions.

These and other objects and advantages are attained by the invention, and the same is described hereinbelow in conjunction with the accompanying drawings, wherein:

FIG. 2 is a side elevation of the boom and vehicle shown in FIG. 1;

FIG. 3 is a cross sectional view, taken generally along the line 3—3 in FIG. 1, illustrating forks and mechanism for lifting these forks provided for supporting a box or other receptacle for collecting picked fruit;

FIG. 5 is a view taken generally along the line 5—5 in FIG. 1, showing details of a track that may be provided to mount a carriage for supporting a sack or other container for holding fruit;

FIG. 6 is a cross sectional view, on a somewhat enlarged scale, further illustrating details of the track and carriage;

FIG. 7 is a simplified drawing illustrating a modification of the invention; and FIG. 8 illustrates schematically a still further modification of the invention.

Figures 1, 4:
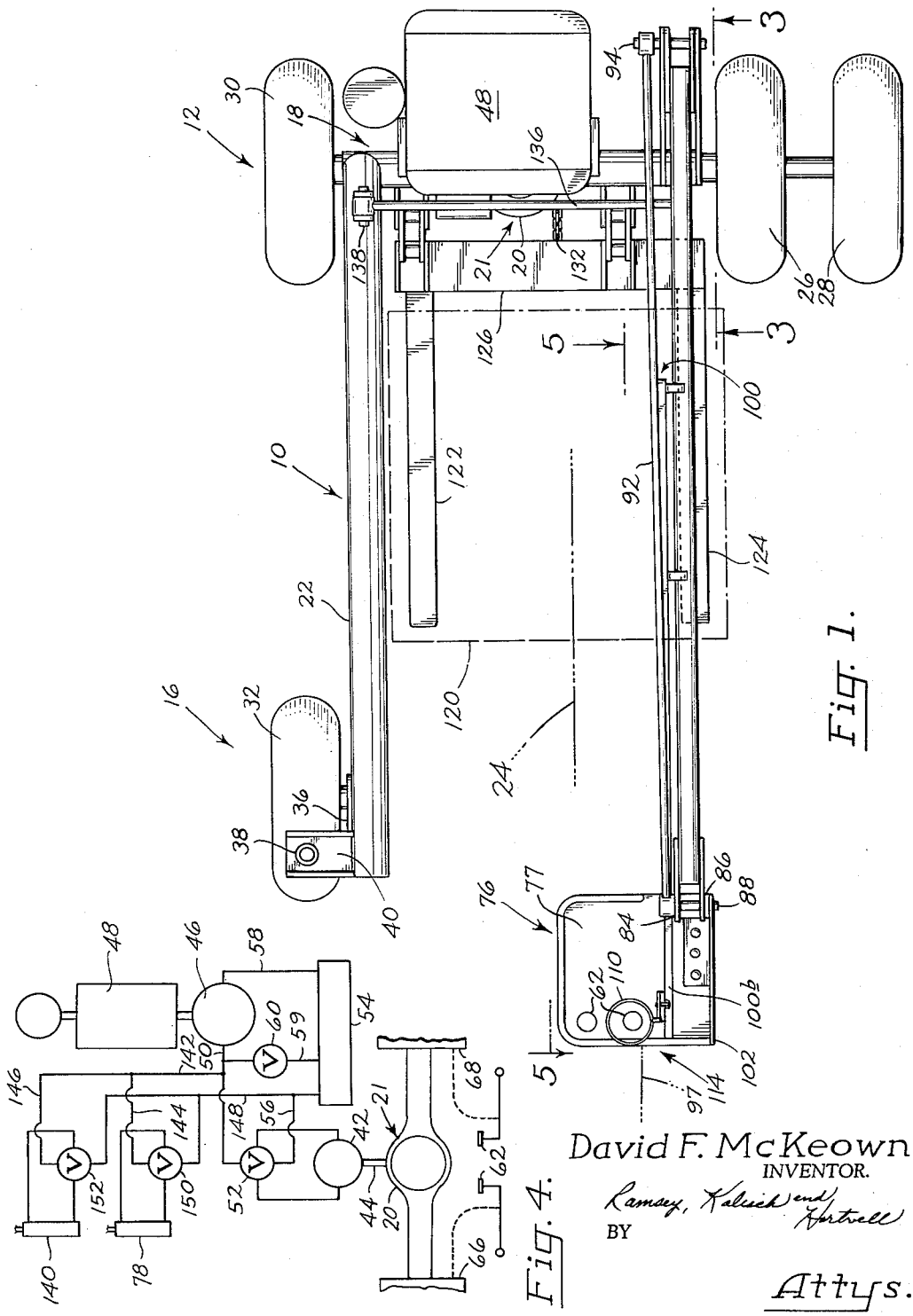
FIG. 1 is a top plan view of a vehicle with a boom constructed according to one embodiment of the invention, such including a pair of rear wheel assemblies and a swiveled front wheel assembly supporting the vehicle for movement, and a boom extending longitudinally of the vehicle along one side thereof.
FIG. 4 is a schematic drawing showing drive means for the vehicle and controls therefor.

Referring now to the drawings, and first of all more particularly to FIGS. 1 and 2, the vehicle here illustrated includes a vehicle frame 10, and wheel assemblies supporting the vehicle frame for movement over the ground, comprising a pair of rear wheel assemblies on opposite sides of the vehicle shown at 12 and 14, and a swiveled front wheel assembly 16. Rear wheel assembly 14 comprises dual wheels 26, 28, but these rotate about a common transversely extending axis and are disposed on the same side of the vehicle, and thus together constitute a single wheel assembly. The multiple wheel assemblies shown provide what is referred to herein as tricycle-type support for the vehicle, and because of this, at all times and regardless of ground contour, the vehicle is evenly balanced on the ground with each wheel assembly supporting a substantial portion of the weight of the vehicle.

Vehicle frame 10 includes transverse axle structure 18 adjacent the rear of the vehicle including a housing 20 for differential gearing 21, and a longitudinal frame section 22 shown in the form of an elongated tube fastened to the transverse axle structure and extending forwardly thereof. The vehicle's longitudinal midline is indicated at 24, and it will be noted that frame section 22 is on one side of the vehicle and its longitudinal midline.

Wheels 26, 28 of wheel assembly 14 are connected to the usual shaft (not shown) driven by differential gearing 21. Wheel assembly 12 includes a single wheel 30 connected to a similar shaft at the other side of the vehicle also driven by the differential gearing. Front wheel assembly 16 includes a wheel 32 journaled at 34 on an inclined post 36. Post 36 swivels at 38 about an upright axis in a bracket 40 secured to the forward end of longitudinal frame section 22.

In the embodiment of the invention illustrated in FIGS. 1 through 6, and referring to FIG. 4, the vehicle is powered by a hydraulic motor 42 connected as by transmitting means or shaft 44 to differential gearing 21. The hydraulic motor is powered by a pump 46 driven by internal combustion engine 48. Hydraulic fluid pumped by the pump flows through an output conduit 50 to a control valve 52, which valve is adjustable to direct hydraulic fluid in either of opposite directions through motor 42. Motor 42 is reversible, its operating direction depending upon the direction of flow of the hydraulic fluid through the motor. Fluid after passing through the motor is returned to a reservoir 54 through a conduit 56. A conduit 58 supplies the pump with fluid from the reservoir. Bypass conduit 59, including a relief valve 60, extends between output conduit 50 and reservoir 54.

The vehicle in the embodiment of FIGS. 1 through 6 is provided with a pair of brake pedals shown at 62 that are selectively actuatable to operate brake mechanisms 66, 68 provided for wheel assemblies 12 and 14, respectively.

With the organization just described, the vehicle may be moved in forward or reverse directions, stopped, and turned, through proper actuation of control valve 52 and mechanisms 66, 68 through brake pedals 62. The brakes and hydraulic motor drive for the differential gearing constitute means for differentially driving the traction wheel assemblies 12, 14, whereby they may be rotated at different speeds. In a turn, the front end of the vehicle swings in an arc as accommodated by swiveled front wheel assembly 16. In a tight turn, as when wheel assembly 12 is braked completely, only wheel assembly 14 rotates and the vehicle turns about a vertical axis approximately located at the center of wheel assembly 12.

Adjacent the rear of the vehicle and extending upwardly from structure 18 is a post 70. This post pivotally mounts adjacent the top thereof at 72 the rear end of an elongated, longitudinally extending boom 74. The boom and post, it will be noted, are on the other side of the longitudinal midline of the vehicle from wheel assemblies 12 and 16. The boom has a forward end which may extend somewhat beyond the forward end of longitudinal frame section 22, and which carries an operator's platform 76 including a floor 77.

The boom is raised and lowered by swinging the front end up and down, by means of a hydraulic ram 78 interposed between the frame of the vehicle and the boom. With extension of the ram, the boom moves upwardly as indicated by the dashed outline in FIG. 5. This upward movement shifts the weight of the boom, and the platform and any operator thereon toward the rear traction wheel assemblies.

Platform 76, it will be noted, has a pair of arms 84, 86 which extend upwardly from floor 77, from adjacent one corner of the floor. The arms are pivotally connected intermediate their ends at 88, to the forward end of the boom. Pivotally connected to the top ends of the arms, at 90, is the forward end of an equalizing rod 92 having its rear end pivotally connected at 94 to an ear 96 joined to post 70. With such a structure, and on raising of the boom by extension of ram 78, the rod tends to swing arms 84, 86 in a direction maintaining a substantially horizontal position for the platform floor.

The longitudinal midline 97 of the platform is laterally offset from the longitudinal axis of the boom as best seen in FIG. 1. By reason of this offset, a bag or container such as that shown at 98 (see FIG. 5) for holding fruit as the same is picked may be mounted on a carriage 114 movable on a track such as track 100 extending along the boom and over the platform, and have a position when located at the forward end of the track which is in front of a picker standing centrally of the platform. This is a convenient position for the bag to be supported as picking progresses, as it enables a picker on the platform to use both right and left hands in picking fruit, and then easily drop such fruit into bag 98. By including the movable carriage for supporting the bag, means is provided for conveying periodically picked fruit along the length of the boom toward the latter's rear end. As will be brought out below, unloading of the bag is performed adjacent the rear end of the boom.

Considering in more detail this conveyor, and referring to FIGS. 1, 5 and 6, track 100 comprises two elongated sections. One section 100a, constitutes the main track section, and this section is fastened to the inside of and extends along the length of the boom. Section 100b constitutes a forward section, and this section extends forwardly of the boom above the floor of platform 76. The forward section is secured to a railing 102 which is part of the platform. Both track sections have the cross section illustrated in FIG. 6, and include an elongated top flange 104, and beneath this flange a channel-shaped portion 106 including inturned flanges 106a and upturned flanges 106b.

Carriage 114 which mounts bag 98 includes a bag holder 110 shaped so as to hold the top of the bag open. The bag holder further includes a vertical standard 112, which has mounted on one side thereof bracket structure 115, journaling rollers 116 traveling within the confines of channel-shaped portion 106, and rollers 118 traveling on a face of flange 104. These rollers support the standard and an attached bag in upright position, and accommodate movement of the carriage along the length of the track, more specifically, its sections 100a and 100b.

Two sections are provided in the track to enable that portion extending over platform floor 77 to shift angularly on raising of the boom. As already indicated, the platform shifts angularly relative to the boom on raising of the boom, and this movement must be shared by the outer track section. With the boom lowered, the track sections join smoothly together to accommodate movement of the carriage and bag between forward and rear ends of the boom.

Fruit which is picked may be collected in a receptacle such as the box shown in dashed outline at 120. This box is carried low to the ground, with portions extending to either side of the longitudinal midline of the vehicle, adjacent the traction wheel assemblies at the rear of the vehicle. Shown supporting a box above the ground are forks 122, 124, which are also used to lift a box off the ground in loading the vehicle, and to lower a box to the ground when unloading the vehicle.

Forks 122, 124 are fixed to a cross piece 126 and this cross piece, as best illustrated in FIG. 3, is pivotally connected through links 128 to brackets 130 which are joined to transverse axle structure 18. Power-operated means for raising and lowering the forks takes the form of a chain 132 connected to the cross piece at one end and connected at its other end to an intermediate portion of a rod 136. This rod is pivotally mounted at 138 on the frame (see FIG. 1), and has its opposite end journaled on the extremity of a rod projecting from a ram 140. On extension of the ram, rod 136 is swung upwardly to raise the forks through the chain. With contraction of the ram, the forks are lowered.

Rams 78, 140, described in connection with raising the boom and elevating the forks, may be supplied hydraulic fluid by pump 46 shown in FIG. 4 already described in connection with driving the traction wheels. Thus, as illustrated in FIG. 4, connected to output conduit 50 is a conduit 142 and this conduit is for the supply of hydraulic fluid under pressure to ram 78 through conduit 144 and ram 140 through conduit 146. A return conduit for these two rams is shown at 148 and valves for producing selective extension of the rams are shown at 150 and 152.

Control handles for the various valves, as well as the foot pedals for the brakes, are mounted on the operator's platform so as to be manipulatable by an operator on the platform. Thus, in FIG. 2, the brake pedals are indicated by the same reference numeral used in connection with the pedals in FIG. 4. Handle 154 is for the actuation of valve 52, and handles 156, 158 actuate valves 150, 152 controlling movement of rams 150, 152. These handles may be mechanically connected to the valves, or linked by means such as an electrical control circuit, the latter being preferable if the valves are located at a point remote from the platform.

Referring now to FIG. 7, here another modification of the invention is illustrated. In this modification, tricycle-type support is contemplated, including rear support wheel assemblies 160, 162 mounted on a frame 164. The rear wheel assemblies are not exactly aligned in a transverse direction, and the assembly on the left of the vehicle is shown spaced somewhat forwardly from the wheel assembly on the vehicle's right. Frame 164 includes a longitudinally extending section 166 having mounted on the forward end thereof a swiveled front wheel assembly 168. A boom shown at 170 supporting an operator's platform 172 is pivotally connected adjacent its rear end to the vehicle frame, and this boom may be raised and lowered by means similar to the mechanism described in connection with the first discussed modification of the invention.

An internal combustion engine is shown at 176, which drives a pump 178. This pump may be utilized to actuate separate hydraulic motors provided for each of the rear wheel assemblies, as shown schematically in FIG. 8. Such motors in FIG. 8 are indicated at 180 and 182. Each is reversible, and each is controlled by a valve such as those shown at 184, 186, whereby the hydraulic motor may be operated in either a forward or a reverse direction, or stopped. In this modification of the invention, braking may be performed through controlling the hydraulic motors by manipulation of valves 184, 186. Differential gearing may be eliminated, because of the inclusion of a separate hydraulic motor for each of the rear traction wheels. Considerable variation in the distribution of weight on the vehicle is permitted, and engine 176, for instance, may be located directly adjacent the side of the vehicle containing the swiveled front wheel assembly.

In general terms, and describing the operation of the vehicle contemplated, when pruning an orchard, an operator may station himself on the platform and travel to the trees to be cared for with the boom lowered as shown in FIG. 1. Both rear wheel assemblies are driven, and this assures good traction. With the vehicle adjacent a tree, the platform may be elevated to any desired position, and this has the effect of increasing traction since this produces a weight shift toward the rear of the vehicle.

The platform is easily positioned at most all locations adjacent a tree, including directly adjacent its trunk. It is possible even to straddle a tree trunk by placing the swiveled front wheel assembly on one side of the trunk and the platform on the other. This maneuverability is important in increasing the usefulness of the vehicle. The vehicle construction enables the platform to be placed above terrain which is unpassable to a wheel, which is important in obtaining flexibility. To shift the platform from side to side, the operator need only brake one of the rear wheel assemblies while driving the other, which swings the front end.

In using the vehicle for picking purposes, a box or container may be placed on the forks and transporated to the picking area. A picker may place a bag such as that shown at 98 on the carriage described, and using the carriage, have the bag supported adjacent a forward part of the platform. The picker need not carry the bag as fruit is picked. To empty the contents of the bag into the box, the boom is lowered, which straightens up the track on its inside, enabling the bag and carriage to be shifted rearwardly on the boom, whereby the bag may be moved over the box. If the bag is like a conventional picking bag, it may have an openable bottom, and a picker may use the bag to direct the contents of the bag to various portions of the box without damage to the fruit.

While embodiments of this invention have been described, it is obvious that changes and variations are possible without departing from the invention. It is desired to cover all such modifications and variations as would be apparent to one skilled in the art, and that come within the scope of the appended claims.

It is claimed and desired to secure by Letters Patent:
1. A vehicle with boom comprising
   a vehicle frame, including axle structure adjacent the rear of the vehicle for mounting a pair of lateral support wheel assemblies with one adjacent one side and one adjacent the opposite side of the vehicle frame, and a longitudinal frame section located to one side of the longitudinal midline of the vehicle extending forwardly of said axle structure,
   a pair of lateral support wheel assemblies mounted on said axle structure adjacent opposite sides of the vehicle,
   a swiveled front wheel assembly mounted on and supporting the forward end of the longitudinal frame section,
   means mounted on the vehicle frame for supporting a receptacle with such located to one side of said longitudinal frame section and substantially over the longitudinal midline of the vehicle,
   a longitudinally extending boom connected to the vehicle frame adjacent the rear end thereof and located on the opposite side of the longitudinal midline of the vehicle from said longitudinal frame section, said boom extending forwardly to a free end disposed adjacent the forward end of the vehicle, and
   means for swinging said free end of the boom upwardly from the vehicle frame.

2. The vehicle of claim 1, wherein means is provided for driving said lateral support wheel assemblies, whereby the vehicle is self-powered, and an operator's platform is mounted on said boom adjacent the free end thereof, upward swinging of the free end of the boom being effective to move the free end and the platform toward the lateral support wheel assemblies at the rear of the vehicle.

3. The vehicle of claim 2, wherein the means for supporting the receptacle comprises fork means defining a platform mounted on the vehicle frame, and which further comprises mechanism for producing vertical movement in said fork means.

4. The vehicle of claim 3, wherein said boom has track means along the inside thereof defining a path of travel for a container support along the length of the boom, and said track means extends rearwardly on the boom to a location above said fork means.

5. A vehicle with a boom comprising
   a vehicle frame, and support wheel assemblies for supporting the vehicle for movement over the ground,
   an elongated substantially horizontal boom, and means pivotally mounting one end of the boom on said vehicle frame with the boom's opposite end being raisable on pivoting of the boom,
   means connected to the boom for pivoting the boom whereby its opposite one end is raised,
   an operator's platform mounted on said boom adjacent its said opposite end,
   a first container for holding articles, and means mounting said container adjacent said operator's platform on the boom, said means mounting said container including means whereby the container may be moved while mounted on the boom from its position adjacent the operator's platform to another position located nearer the boom's one end from said operator's platform, and a second container for holding articles mounted on said vehicle in a position beneath said first container with said first container in its second-mentioned position.

6. A vehicle with boom comprising a vehicle frame, a lateral support wheel assembly mounted on said frame on one side of the vehicle and another lateral support wheel assembly mounted on said frame on the opposite side of the vehicle, said support wheel assemblies being adjacent and supporting the rear end of the vehicle for movement over the ground, said vehicle frame including a longitudinal frame section located on one side of the vehicle extending longitudinally of the vehicle and terminating at a forward end disposed adjacent the forward end of the vehicle, a third wheel assembly mounted on said forward end of the longitudinal frame section for turning about an upright axis and constituting the sole support for the forward end of the vehicle, a longitudinally extending boom connected to the vehicle adjacent the rear end of the latter and located on the opposite side of the vehicle and spaced laterally from said longitudinal frame section, said boom extending forwardly to a free end disposed adjacent the forward end of the vehicle, which free end is spaced laterally toward said opposite side of the vehicle from said third wheel assembly, and means for swinging said free end of the boom upwardly from the vehicle frame.

7. The vehicle of claim 6, which further includes means mounted on the vehicle frame for supporting a receptacle, with such located on said vehicle between said longitudinal frame section on said one side of the vehicle and said boom on said opposite side of the vehicle, and over substantially the longitudinal midline of the vehicle.

8. A vehicle with boom comprising a vehicle frame, a lateral support wheel assembly mounted on said frame on one side of the vehicle and another lateral support wheel assembly mounted on said frame on the opposite side of the vehicle with said support wheel assemblies supporting the rear end of the vehicle for movement over the ground, said vehicle frame including a longitudinal frame section located on one side of the vehicle extending longitudinally of the vehicle and terminating in a forward end disposed adjacent the forward end of the vehicle, a front wheel assembly mounted on said forward end of the frame section for turning about an upright axis and constituting the sole support for the forward end of the vehicle, a longitudinally extending boom located on the opposite side of the vehicle from said longitudinal frame section and pivot means pivotally connecting the boom to the vehicle frame adjacent the rear end of the vehicle, said boom extending forwardly from said pivot means to a free end disposed adjacent the forward end of the vehicle, the lateral support wheel assembly which is mounted on said opposite side of the vehicle being located nearer the forward end of the vehicle than the lateral support wheel assembly which is mounted on said one side of the vehicle, and the pivot means pivotally connecting the boom to the vehicle frame being located rearwardly of said lateral support wheel assembly on said opposite side of the vehicle.

9. The vehicle of claim 8, which further comprises a container located between said first and second lateral support wheel assemblies, a second container disposed in a position adjacent the free end of said boom, and means mounting said second container on said boom, said means accommodating shifting of said second container from its position adjacent the free end of the boom to a position located nearer the end of the boom opposite its said free end.

10. A vehicle with boom comprising a vehicle frame, means for propelling the vehicle over the ground comprising first and second power-driven traction wheel assemblies mounted on the vehicle frame on opposite sides of the vehicle, a swiveled support wheel assembly mounted on the vehicle frame spaced toward one end of the vehicle from said first and second traction wheel assemblies, a boom having a raisable end which is spaced toward said one end of the vehicle from said first and second traction wheel assemblies, adjacent the swiveled support wheel assembly, and an opposite end pivotally mounted on the vehicle at a point located toward the end of the vehicle opposite the vehicle's said one end, said raisable end of the boom when raised thus moving upwardly in a region located toward said one end of the vehicle from said first and second traction wheel assemblies.

a container for holding articles, and means mounting said container on said boom with said container positioned adjacent said raisable end of the boom, said means mounting said container enabling shifting of the container while the container is mounted on the boom from its position adjacent the boom's raisable end to a position located nearer the boom's opposite end, and means controlling movement of the traction wheel assemblies whereby one may be rotated relative to the other to produce lateral swinging of said one end of the vehicle which is supported on the swivel support wheel assembly, and conjointly with such swinging laterally swinging of said raisable end of the boom.

11. The vehicle of claim 10, wherein the container for holding articles has flexible side walls, and a bottom which is openable, to enable such articles to fall out of the bottom of the container with the direction that articles take being controlled by flexing of the side walls of the container.

12. The vehicle of claim 10, wherein the means mounting the container comprises a track extending along the length of the boom, and a container support mounted on the track for movement along the length thereof, said container support having said container mounted thereon.

13. A vehicle with boom comprising a vehicle frame and support wheel assemblies supporting the vehicle for movement over the ground, an elongated substantially horizontal boom having an operator's station adjacent one end, and means pivotally mounting the end of the boom opposite said one end on the vehicle frame, with the boom's said one end being raisable on pivoting of the boom, means connected to the boom for pivoting the boom whereby its said one end is raised, a container for holding articles mounted on the boom adjacent its said one end, said container for holding articles being mounted on said boom through means which accommodates movement of the container while mounted on the boom from its position adjacent said one end of the boom to another position located nearer the boom's opposite end, and means mounted on said vehicle adjacent said container with said container in its second-mentioned position adapted to support another container with such in a position to receive articles discharged from said first-mentioned container.

14. The vehicle of claim 10, wherein said means mounting said container comprises a track extending along the length of the boom, and a container support mounted on the track for movement along the length thereof, said container support having said container mounted thereon.

References Cited by the Examiner

UNITED STATES PATENTS

| | | | |
|---|---|---|---|
| 2,740,486 | 4/1956 | Wayman | 180—25 |
| 2,749,997 | 6/1956 | Deslippe | 180—25 |
| 3,003,779 | 10/1961 | Allison | 180—6.2 X |
| 3,088,609 | 5/1963 | Franzen | 214—83.1 |
| 3,120,091 | 2/1964 | Gould et al. | 56—328 |
| 3,156,313 | 11/1964 | Peterson | 180—27 X |
| 3,163,880 | 1/1965 | Johnson | 214—83.1 X |
| 3,182,827 | 5/1965 | Frost | 214—83.1 |

FOREIGN PATENTS 569,199   1/1959   Canada.

GERALD M. FORLENZA, *Primary Examiner.*

A. J. MAKAY, *Assistant Examiner.*